R. D. SWEENEY.
POWER TRANSMISSION GEARING.
APPLICATION FILED OCT 19, 1912.
1,058,921.
Patented Apr. 15, 1913.
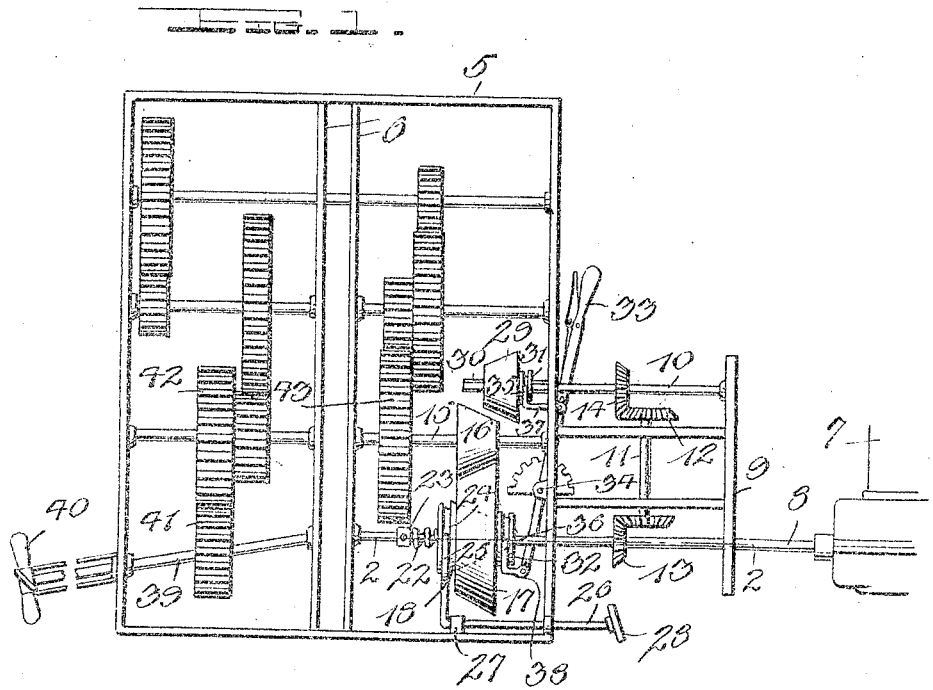
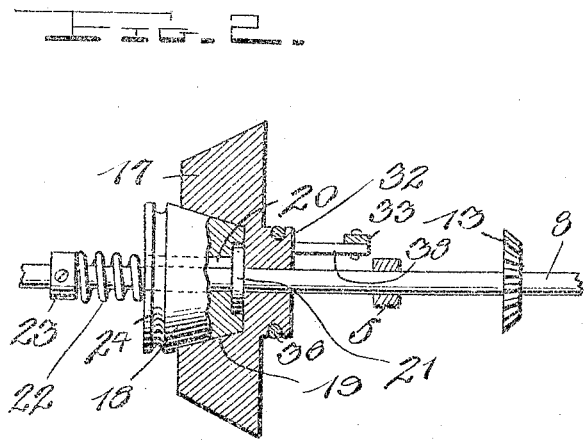
Witnesses
Chas. L. Grieshauer
A. J. Hind
Inventor
R. D. Sweeney
By Watson E. Coleman,
Attorney

UNITED STATES PATENT OFFICE.

ROBERT D. SWEENEY, OF GARNIERS, FLORIDA.

POWER-TRANSMISSION GEARING.

1,058,921.

Specification of Letters Patent. Patented Apr. 15, 1913.

Application filed October 19, 1912. Serial No. 726,834.

*To all whom it may concern:*

Be it known that I, ROBERT D. SWEENEY, a citizen of the United States, residing at Garniers, in the county of Santa Rosa and State of Florida, have invented certain new and useful Improvements in Power-Transmission Gearing, of which the following is a specification, reference being had to the accompanying drawings.

This invention relates to improvements in power transmission gearing for the operation of boats and other motor driven vehicles, and machines of various kinds, the invention having for its primary object the provision of simple and efficient means for easily and quickly reversing the operation of the driven shaft.

Another object of the invention is to provide improved means for momentarily throwing the transmission gearing out of operation without interrupting the operation of the engine.

Still another object of the invention is to provide a friction wheel loosely mounted upon the engine shaft, and means longitudinally shiftable upon said shaft and normally locking the friction wheel thereon, a second shaft arranged in parallel relation to the engine shaft, gearing connecting said shafts, a friction pulley longitudinally shiftable upon the latter shaft, a transmission shaft having a friction pulley fixed thereon to be engaged by the pulleys upon said parallel shafts, and means for simultaneously shifting the pulleys upon the engine shaft and parallel shaft in opposite directions to reverse the rotation of the transmission shaft.

A still further object of the invention is to provide mechanism for the above purpose which is simple and durable in construction, highly efficient in operation and may be produced at comparatively small cost.

With the above and other objects in view as will become apparent as the description proceeds, the invention consists in certain constructions combinations and arrangements of the parts that I shall hereinafter fully describe and claim.

For a full understanding of the invention, reference is to be had to the following description and accompanying drawings, in which—

Figure 1 is a side elevation of power transmission gearing embodying the present invention; Fig. 2 is a section taken on the line 2—2 of Fig. 1.

In the accompanying drawings, I have illustrated one embodiment of my transmission gearing in connection with the propeller shaft of a motor boat, but it will be understood that my invention is not limited to such specific use but may be employed for the operation of motor driven vehicles of various types as well as machines used for numerous purposes.

In the drawings, 5 designates an upright frame structure which is preferably of rectangular form as shown and includes the centrally arranged spaced vertical bars 6. These bars as well as the outer vertical bars of the frame 5 are provided with suitable bearings for the support of the several power transmitting shafts to be later referred to.

7 designates an engine of any approved form, and 8 indicates the shaft thereof which is supported upon a suitable frame structure 9 and is rotatably mounted in one of the central bars 6 of the frame 5. A shaft 10 is arranged in parallel relation with the engine shaft, and journaled at one end in a bearing provided upon the frame structure 9, the other end of said shaft being supported in the frame 5. A perpendicular shaft 11 is mounted upon the frame structure 9 and is provided upon each of its ends with a beveled pinion 12. One of these pinions meshes with a similar pinion 13 fixed upon the engine shaft while the other pinion 12 engages with a beveled pinion 14 secured upon the shaft 10.

Arranged intermediate of the shafts 8, 10 and in parallel relation thereto, a transmitting shaft 15 is rotatably mounted in the frame 5. Upon this shaft, a frusto-conical friction wheel 16 is fixed. A large friction disk 17 is loosely mounted upon the engine shaft 8 and is normally locked for rotation with said shaft by means of a sliding frusto-conical clutch head 18, said friction disk 17 having a central recess 19 to receive said clutch head, said head frictionally engaging the annular wall of the recess. The bore of the clutch head 18 is provided with a key way to receive the key 20 integrally formed upon the engine shaft. At one end of this key an annular flange 21 is formed upon the shaft to limit the sliding movement of the clutch head into the recess of the disk 17. The clutch head 18 is yieldingly held in engagement with the flange 21 on the engine shaft by means of a coil spring 22 which loosely surrounds the shaft and bears at one end against an adjustable collar 23 and at its other end against the head 18. The larger end of the head 18 is provided with a peripheral groove 24 to receive a yoke 25 which is formed upon the vertically disposed end of a longitudinally shiftable rod 26, said rod being supported in a suitable bearing 27 fixed to the frame 5. One end of this shiftable rod extends laterally from the frame 5 and is provided with a foot plate 28.

Upon the shaft 10 a frusto-conical friction wheel 29 is keyed as indicated at 30 for longitudinal sliding movement. At the larger end of this friction wheel the same is provided with a reduced extension 31. The friction disk 17 upon the engine shaft is provided with a similar extension 32. A reversing lever 33 is fulcrumed intermediate of its ends upon a rack 34 fixed to the frame 5, said lever carrying the usual spring-pressed dog for engagement with the teeth of the rack. Yokes 35 and 36 are loosely arranged in annular grooves provided in the extensions 31 and 32 of the friction members 30 and 17 respectively, and from these yokes the arms 37 and 38 extend. These arms are loosely connected to the reversing lever 33 at points respectively above and below the fulcrum point of said lever.

As above described it will be apparent that when the parts are in the position shown in Fig. 1, the transmission shaft 15 is driven directly from the engine shaft through the medium of the engaged friction members 16 and 17. Now when it is desired to reverse the direction of rotation of the shaft 15, the operator shifts the lever 33 to the left, thereby moving the disk 17 outwardly upon the engine shaft 8 and simultaneously shifting the friction wheel 29 inwardly upon the shaft 10 into engagement with the periphery of the friction wheel 16. Thus the power is transmitted from the engine shaft through the shaft 10 and the engaged friction wheels, and the rotation of the shaft 15 thus reversed. If the operator desires at any time to temporarily discontinue the operation of the mechanism, it may be readily accomplished without interrupting the operation of the engine, by simply forcing the rod 26 inwardly by the pressure of the foot on the plate 28, thereby disengaging the clutch head 18 from the disk 17 so that said disk will remain stationary in the rotation of the engine shaft 8.

39 indicates a propeller shaft which is mounted in the frame 5 and is provided upon one end with a propeller 40 of any desired or approved form. Upon this shaft within the frame 5 a pinion 41 is fixed and is engaged by one of the elements of a gear train generally indicated by the numeral 42, said train including gears and pinions of different relative sizes as is usual in such mechanisms. The gear train is actuated primarily by means of a large gear or cog wheel 43 fixed upon the transmission shaft 15. Through the medium of the gear train, the propeller shaft 39 will be driven at a comparatively high speed. It is of course apparent that by changing the relative sizes of the gears of the train, any desired speed of the propeller shaft may be attained without necessitating an increase of power in the engine or motor.

From the foregoing it is thought that the construction and manner of operation of my improved power transmission gearing will be clearly understood.

The mechanism is comparatively simple in construction and is at all times under the instant control of the operator.

By the provision of my improved reversing means, the operation of the driven shaft 39 may be easily and quickly reversed without reversing the operation of the motor. The transmission mechanism may also be instantly rendered inoperative to momentarily discontinue the transmission of power to the driven shaft, without interrupting the continued operation of the engine.

It will be obvious that a transmission mechanism constructed as above described will be highly efficient and durable in use and owing to its simplicity may be produced at comparatively small cost.

While I have shown and described the preferred construction and arrangement of the various elements, it will be understood that the invention is susceptible of considerable modification without departing from the essential features or sacrificing any of the advantages thereof.

Having thus described the invention, what is claimed is:

In power transmission mechanism, the combination of a driving shaft and a driven shaft, a transmission shaft and a gear train connecting said transmission shaft to the driven shaft, a shaft arranged in parallel relation to the driving shaft, gearing connecting said shafts, a friction wheel fixed upon the transmission shaft, a friction wheel loosely mounted upon the driving shaft, a friction wheel longitudinally slidable upon said parallel shaft, said latter wheels being adapted for engagement with the friction wheel upon the transmission shaft, a clutch head keyed upon the driving shaft, a spring mounted upon said shaft and bearing against the clutch head to hold the same in engagement with said loosely mounted friction wheel, means for simultaneously shifting the friction wheels upon the parallel shaft and the driving shaft in opposite directions to alternately engage and disengage the same with said friction wheel on the transmission shaft, and additional means for disengaging the sliding clutch head from the loose friction wheel on the driving shaft substantially as and for the purpose specified.

In testimony whereof I hereunto affix my signature in the presence of two witnesses.

ROBERT $\overset{\text{his}}{\times}$ D. SWEENEY.
mark

Witnesses:
C. D. SNOWDEN,
H. R. WEEKLEY.